Dec. 1, 1936.  J. F. OHMER  2,062,602
REGISTER
Filed Dec. 24, 1930   12 Sheets-Sheet 1

INVENTOR
John F. Ohmer
BY Hustings W. Baker
ATTORNEY

Dec. 1, 1936. J. F. OHMER 2,062,602
REGISTER
Filed Dec. 24, 1930 12 Sheets-Sheet 2
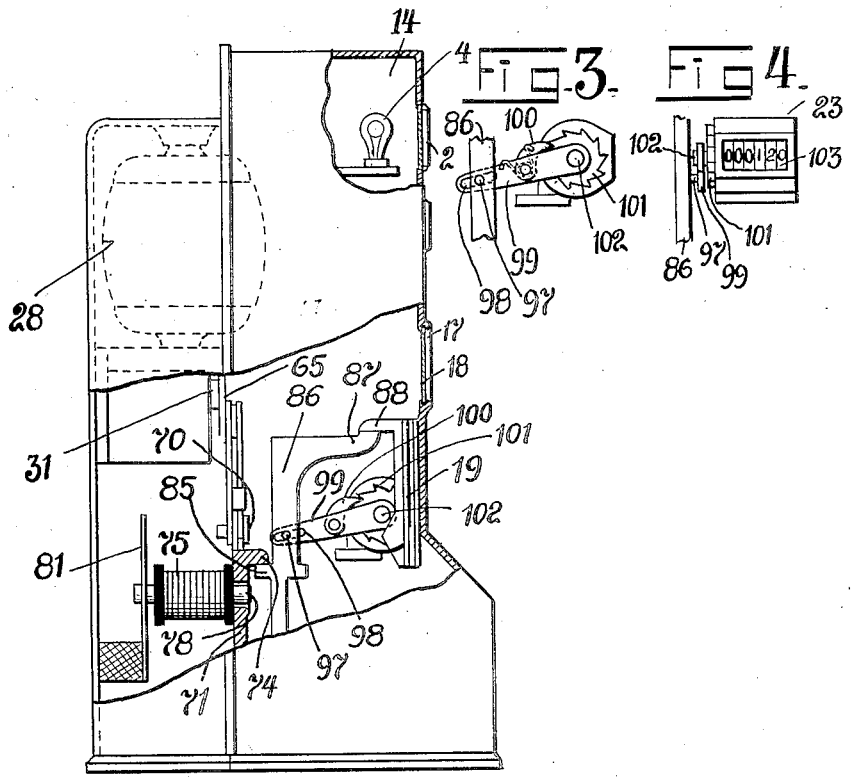
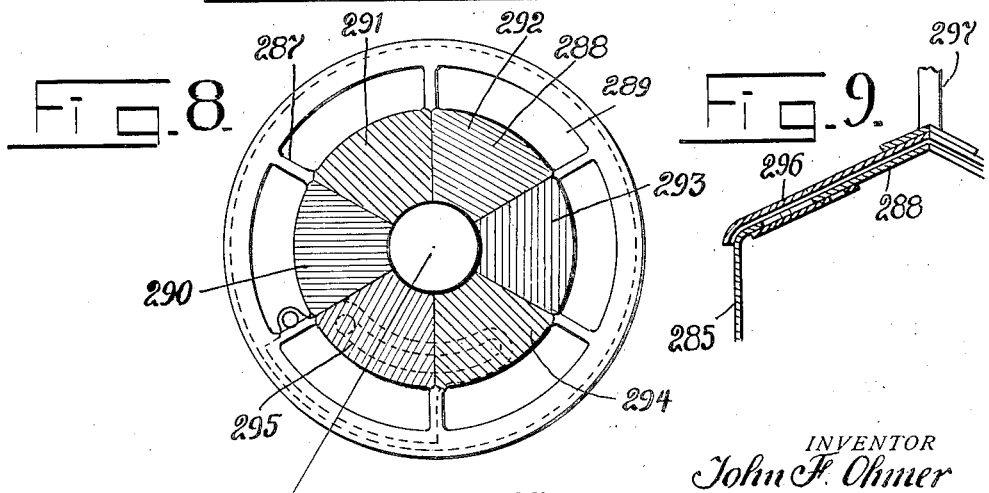
INVENTOR
John F. Ohmer
BY Hastings W. Baker
ATTORNEY

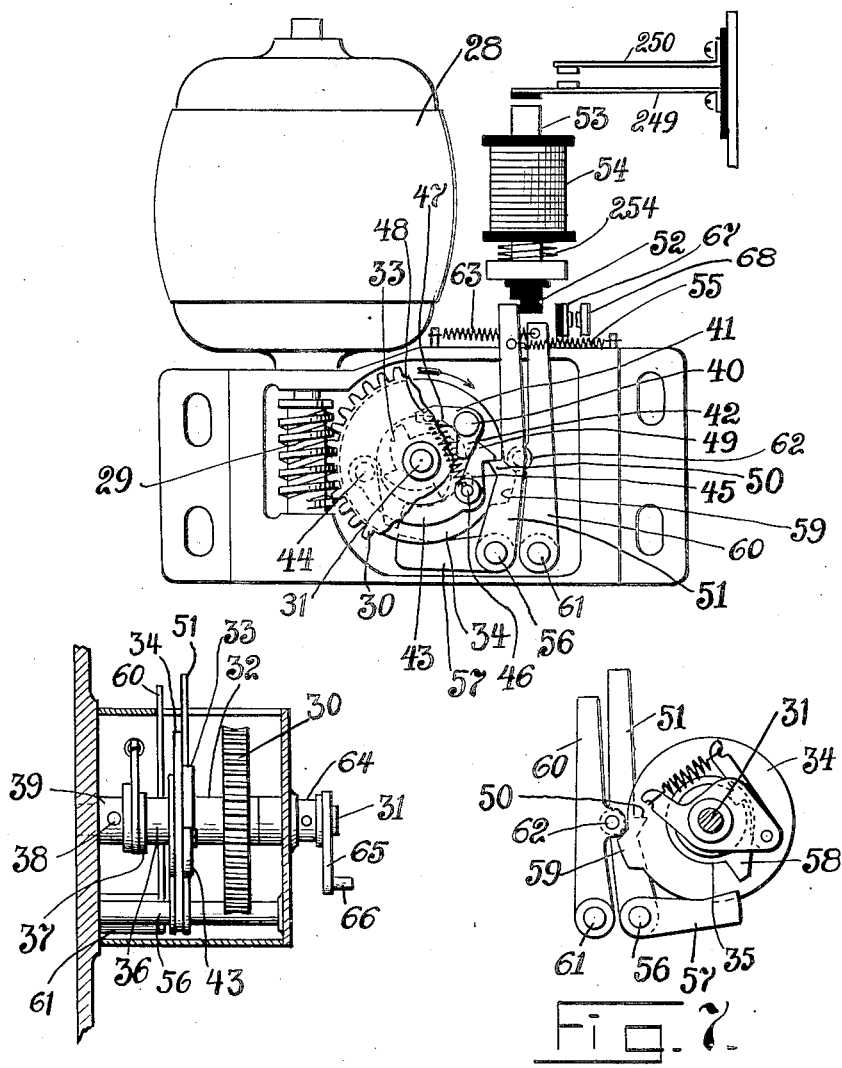

Dec. 1, 1936.  J. F. OHMER  2,062,602
REGISTER
Filed Dec. 24, 1930  12 Sheets-Sheet 4
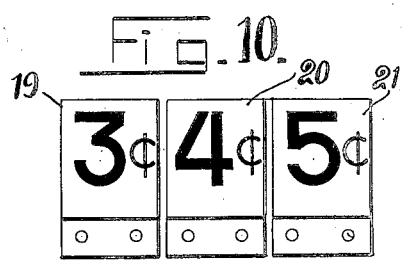
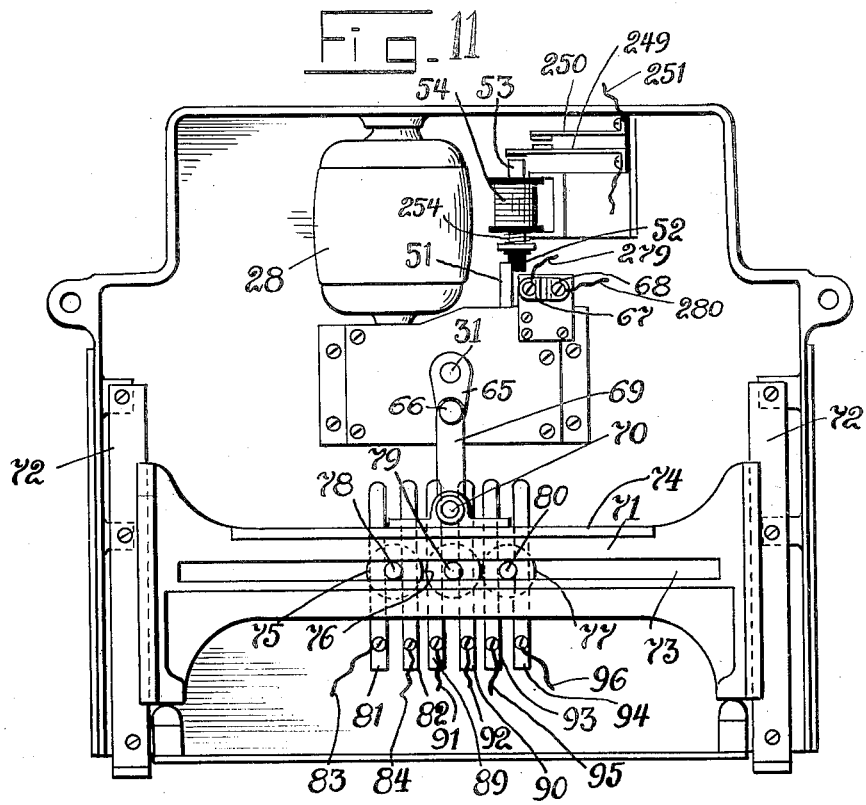
INVENTOR
John F. Ohmer
BY Hastings W. Baker
ATTORNEY Dec. 1, 1936.  J. F. OHMER  2,062,602
REGISTER
Filed Dec. 24, 1930 12 Sheets-Sheet 5
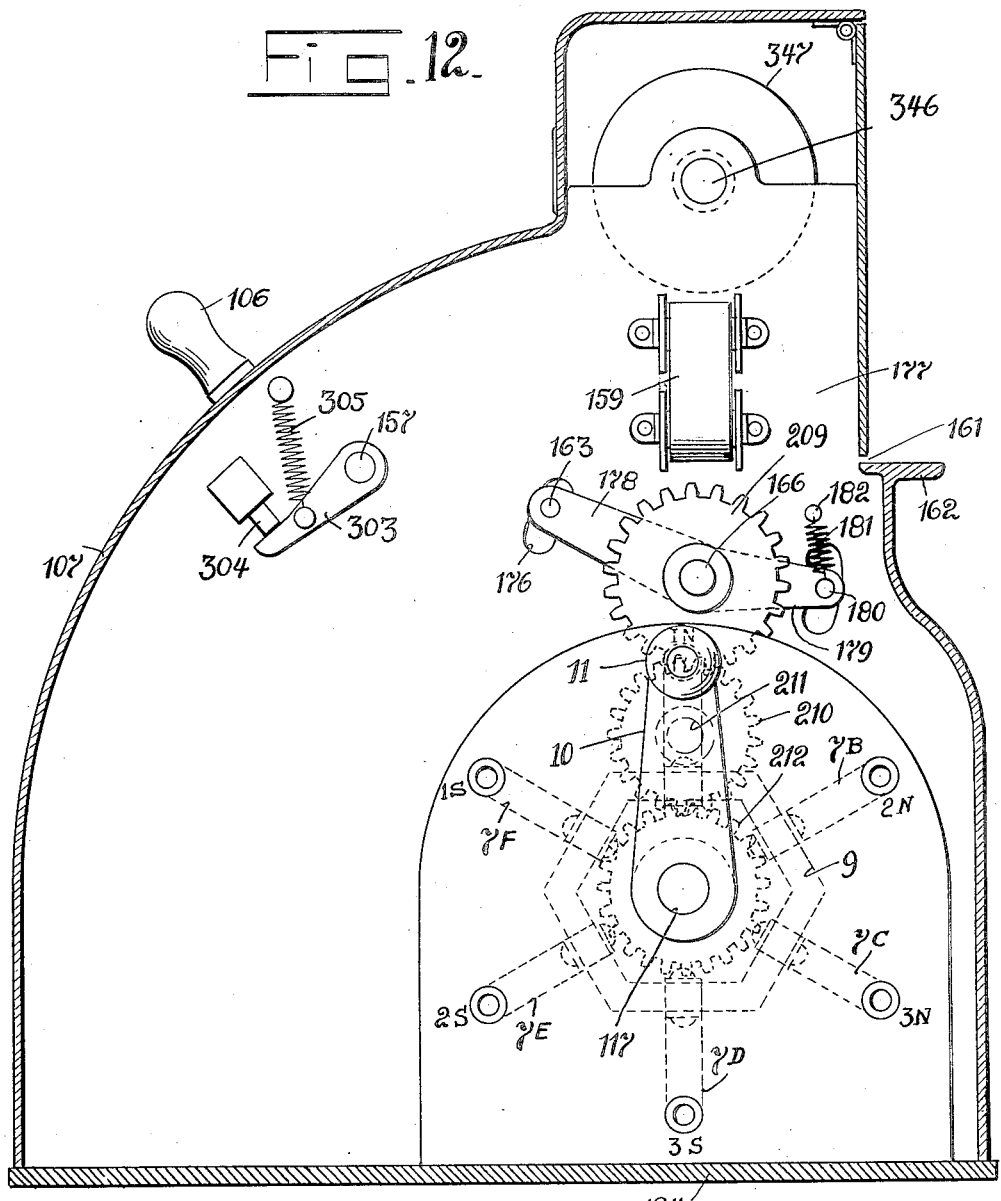
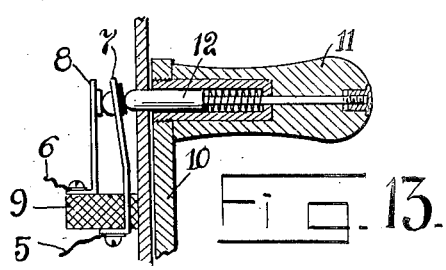
INVENTOR
John F. Ohmer
Hastings W. Baker
ATTORNEY

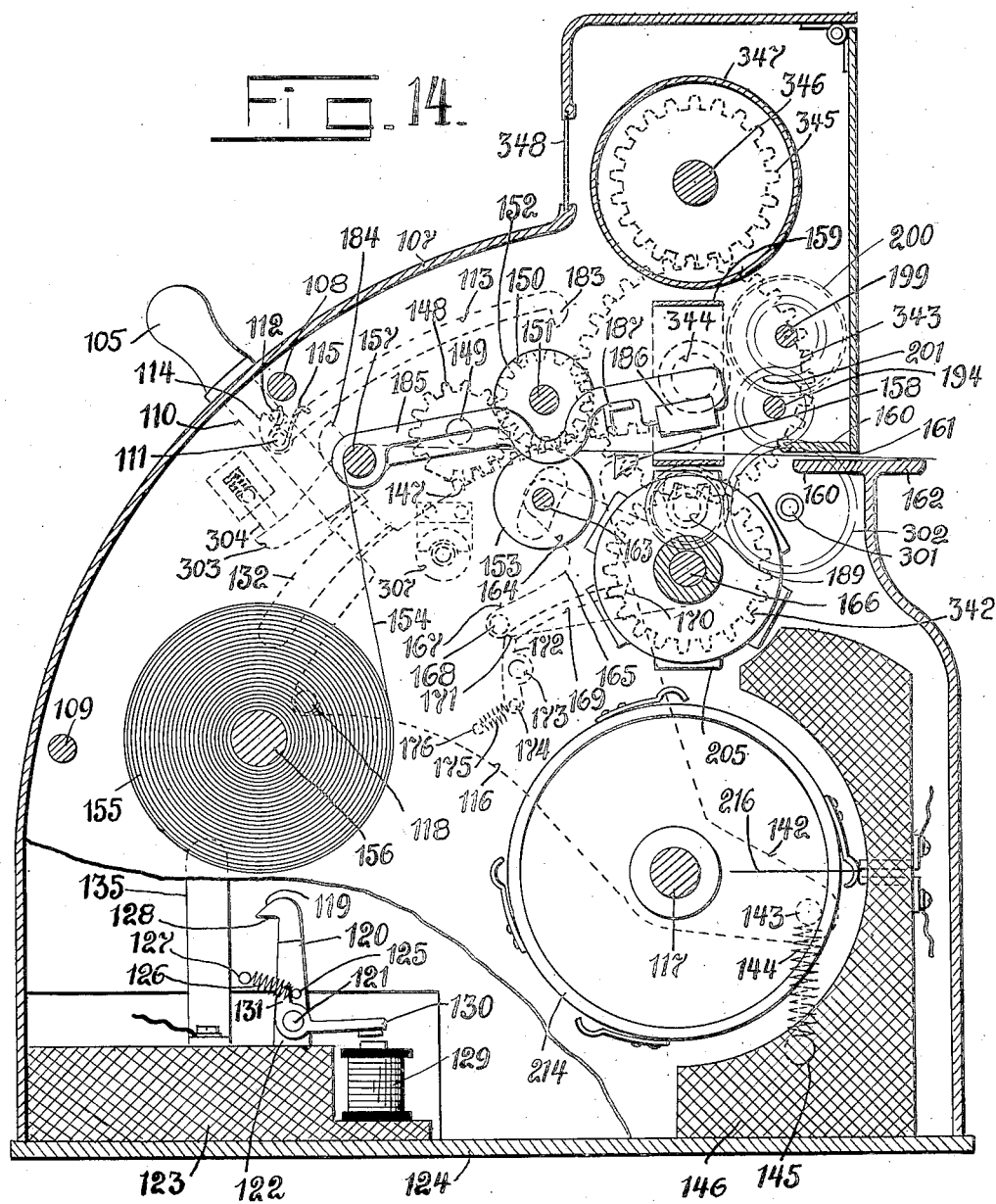

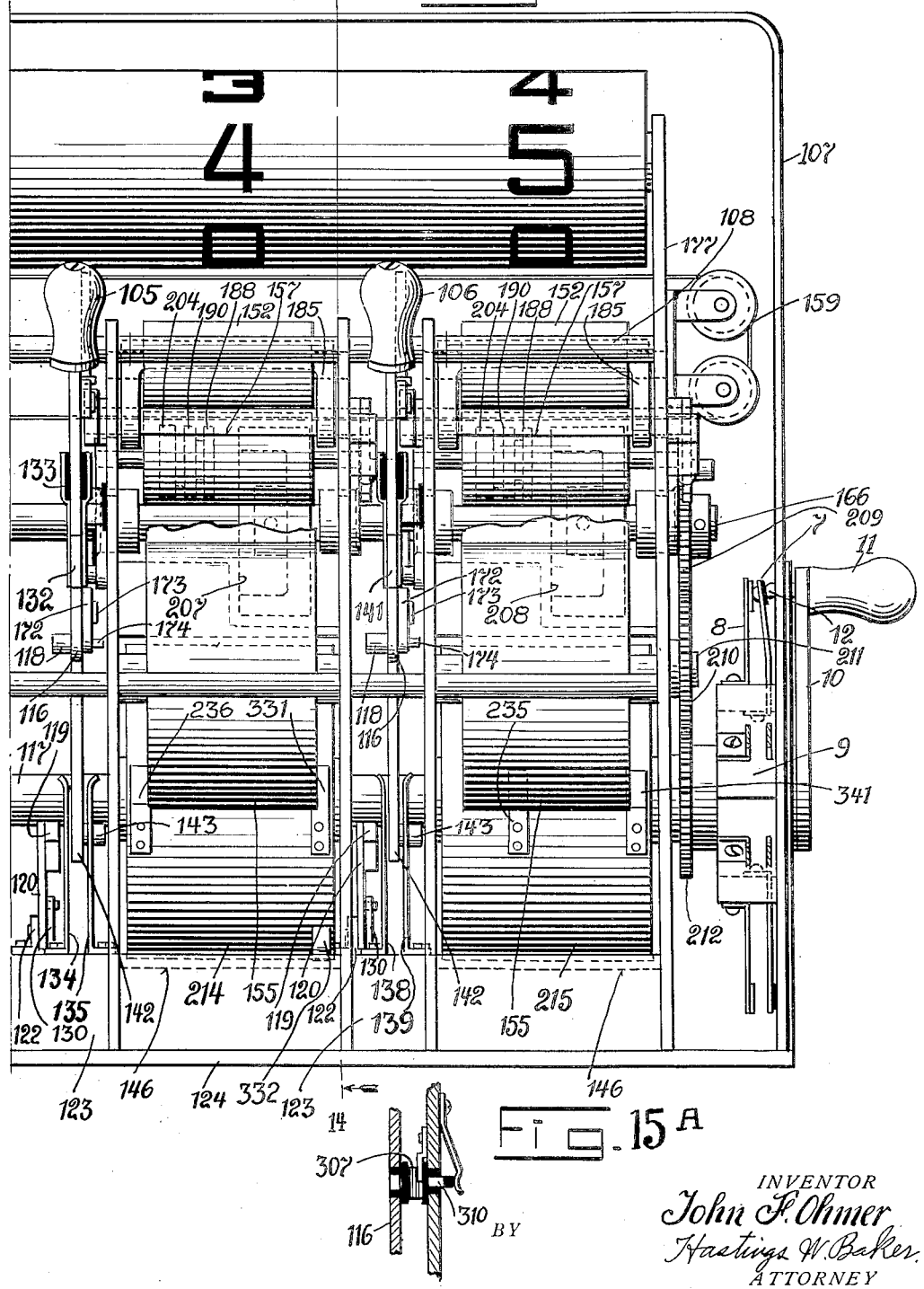

Dec. 1, 1936.   J. F. OHMER   2,062,602
REGISTER
Filed Dec. 24, 1930   12 Sheets-Sheet 9
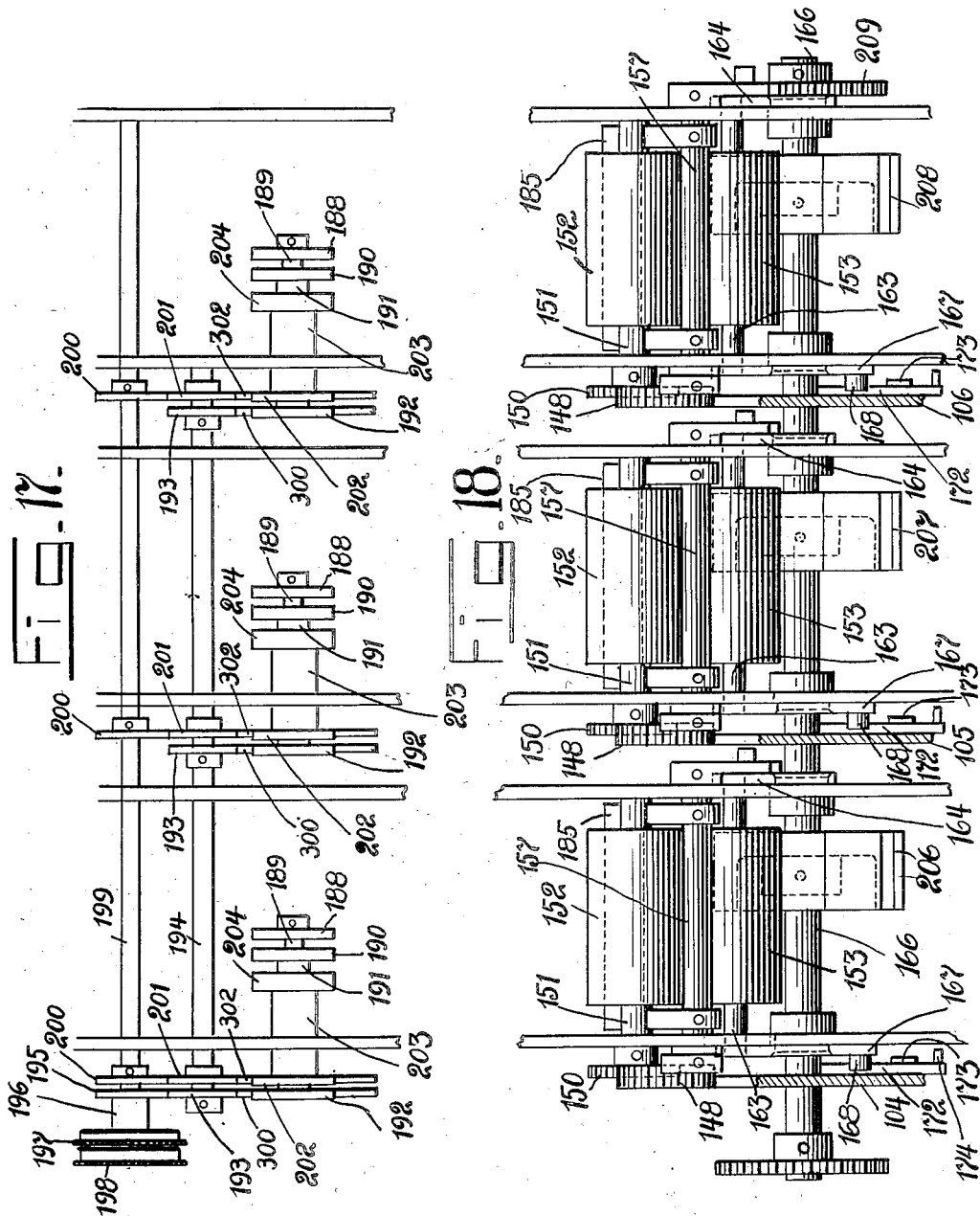
INVENTOR
John F. Ohmer
BY Hastings W. Baker
ATTORNEY

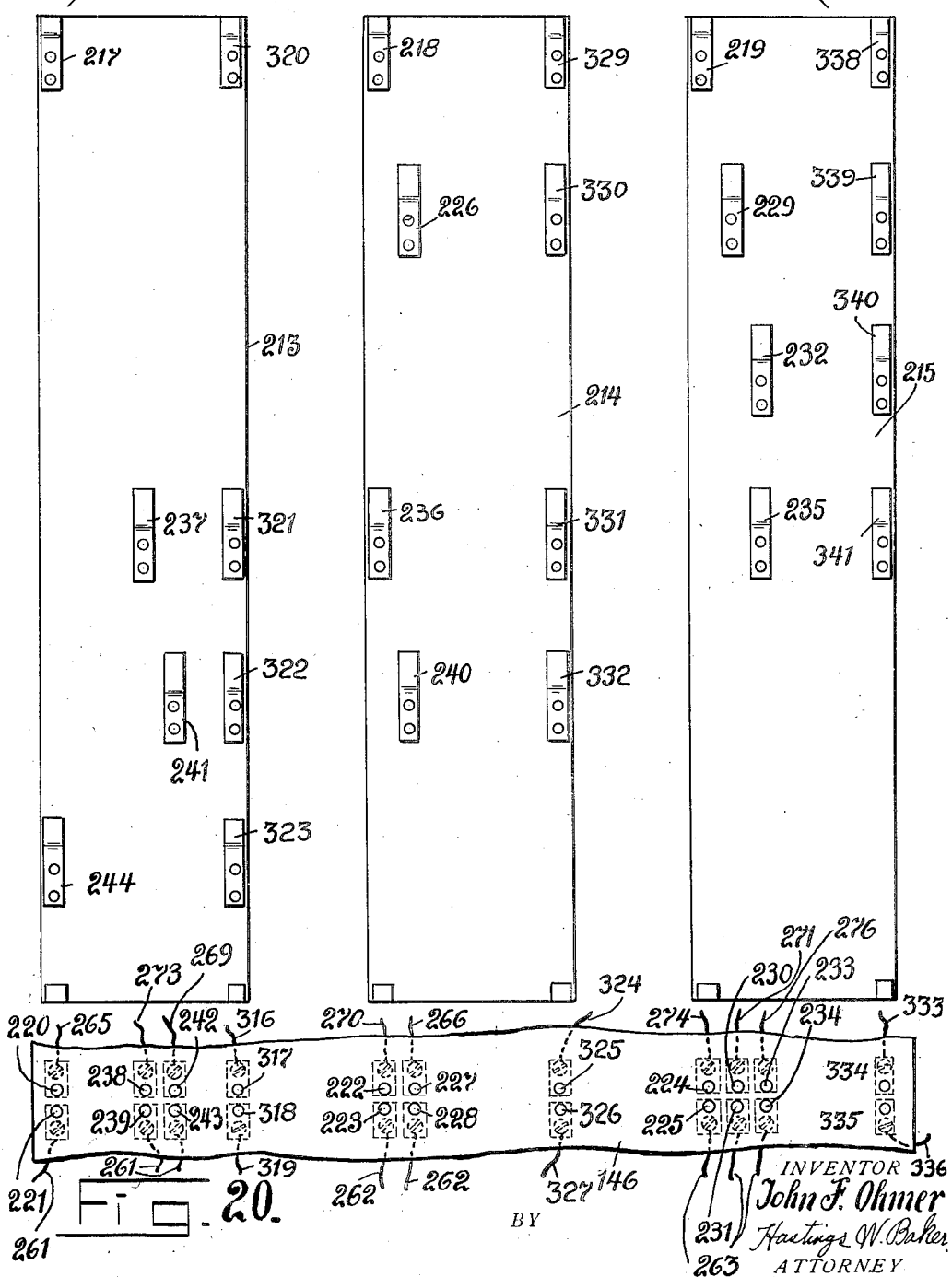

Dec. 1, 1936.  J. F. OHMER  2,062,602

REGISTER

Filed Dec. 24, 1930    12 Sheets-Sheet 11

INVENTOR
John F. Ohmer
BY Hastings W. Baker
ATTORNEY

Dec. 1, 1936. J. F. OHMER 2,062,602
REGISTER
Filed Dec. 24, 1930 12 Sheets-Sheet 12
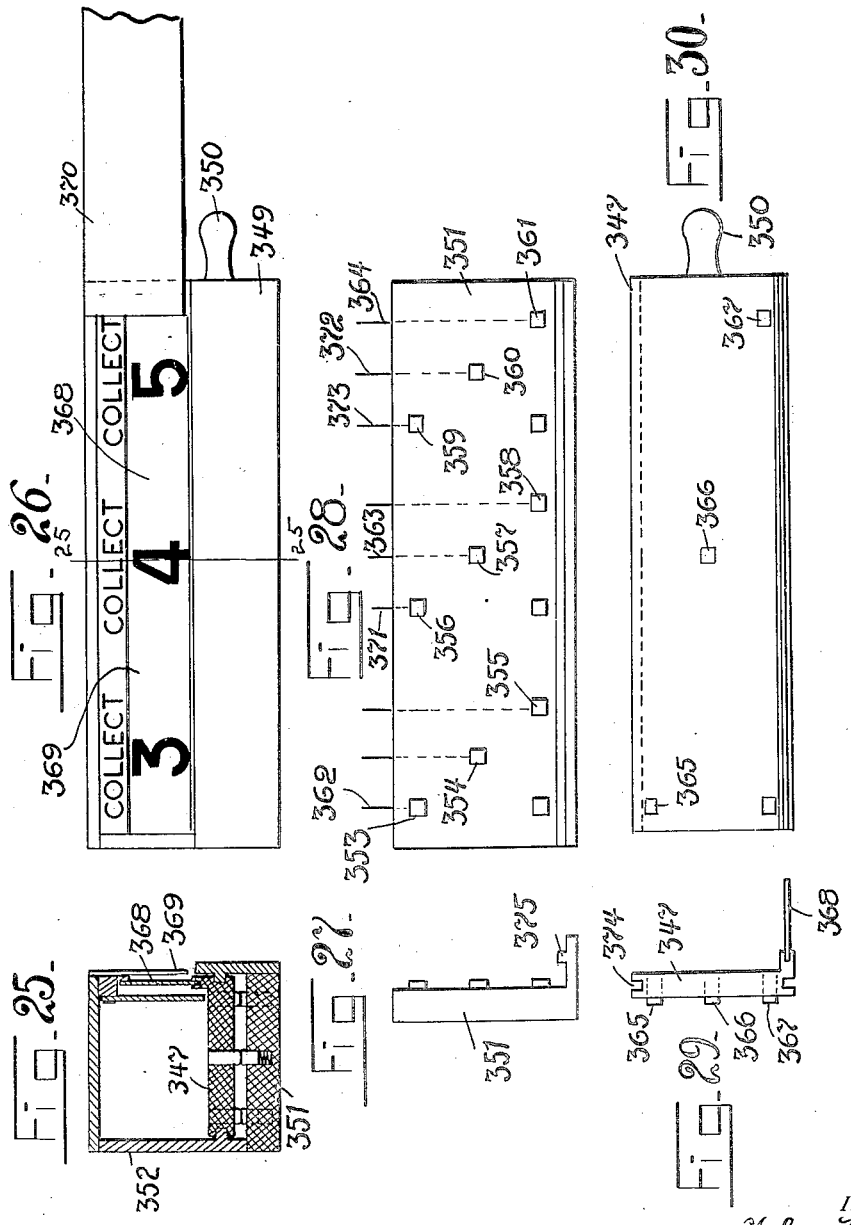
INVENTOR
John F. Ohmer
BY Hastings W. Baker
ATTORNEY Patented Dec. 1, 1936

2,062,602

UNITED STATES PATENT OFFICE 2,062,602

REGISTER

John F. Ohmer, Dayton, Ohio, assignor, by mesne assignments, to Central United National Bank, Cleveland, Ohio, as trustee Application December 24, 1930, Serial No. 504,609

4 Claims. (Cl. 235—31)

The object of this invention is to provide means whereby an accurate record may be made of the zone in which each passenger entered the transportation vehicle and the zone in which he was discharged. A further object of the invention is to provide means whereby the passengers will be at all times informed of the zone in which they are now traveling. This will be a great convenience to passengers, especially when traveling in cities with which they are not familiar or when traveling at night. If a passenger knows that his destination is zone 2, the display of this zone in the register will indicate to him that he is now in the zone where he is to get off and he can at that time speak to the conductor, telling him the exact street where he wishes to leave the conveyance.

While I have shown the invention as applied to zones, it will be, of course, understood that I use the word "zone" in its broad meaning, which would include streets or railway stations or any other suitable designation of the position of the car or bus.

I have shown my invention as applied to a well-known type of register in which there is a counter to register the total number of passengers which have entered the conveyance and the direction of travel, such as "In" and "Out", "North" and "South", or other means to indicate the direction of travel.

I have also provided means to indicate the fare which each passenger has paid for his transportation and I have provided counters to record the number of each kind of fares which have been paid.

I have shown means to record only three zones but it will, of course, be understood that any number of zones may be employed. For the purpose of illustration I have considered that it will cost a passenger 3¢ to ride in the zone in which the car was when he entered the same and it will cost him 1¢ to ride in each zone thereafter. It is obvious that this initial fare could be any figure whatsoever and the charge for riding in each additional zone could be 1¢ or any other figure.

Another object of the invention is to provide means whereby each passenger will be furnished with a ticket or receipt, which tickets are differently colored according to the destination of the passenger. For instance, as shown by way of illustration in the drawings, if the passenger pays his fare to zone 1 he is issued a red ticket, whereas if he pays his fare to zone 2 he is issued a green ticket and if he pays his fare to zone 3 he is issued a blue ticket. If there are additional zones the ticket for each of these zones would be characterized by different destination colors. On each of these tickets the date is printed, as well as the direction of travel of the conveyance and the zone in which the passenger embarked. Each ticket, therefore, shows by its color the destination of the passenger and by the indicia printed thereon the date, the direction of travel and the zone in which the ticket was issued.

In the modern operation of buses, street cars, interurban lines and railways there are certain rush periods at which there are a large number of passengers who desire to enter the car. It is very necessary that the car can be filled in the least possible time. I have, therefore, recognized the fact that it would not be feasible for the conductor to have a large number of levers or keys to set in order to issue a ticket. In order to issue the ticket in the least possible time, I have provided a group of levers, one for each destination zone. As each passenger gets on he pays his fare to the destination where he desires to leave the car. All that the conductor has to do is to collect this fare and pull down the lever corresponding to the destination to which the passenger has paid his fare. The mere fact that the conductor pulls down the proper destination lever issues the ticket or receipt to the passenger, as well as setting in motion electric means to register on the passenger counter and to display the amount of fare registered and register this fare on the proper counter. The conductor, therefore, has only one lever to pull for every passenger who enters the car.

Another object of the invention is to prevent mistakes on the part of the conductor by visibly displaying to him the proper amount of fare which he should collect from the zone in which he at that time is to any zone which the car will later pass through.

Another object of the invention is to provide a single lever, which will be actuated by the conductor at the time he enters a new zone, which will illuminate a light to show to the passenger that the car is now passing into a new zone and the number of that zone. The operation of this lever also changes the indicia which the conductor can see to show him the amount of fare which should be paid in that zone and succeeding zones. The operation of this lever also changes all of the printing devices which will print on all of the tickets the zone in which the passenger entered the car.

Various other objects will appear in the detailed description and claims which follow.

In the drawings I have shown, by way of illustration, means to accomplish the desired results in which Figure 1 is an elevational view of one of the well-known types of Ohmer fare registers which is usually mounted in the front end of a car or bus.

Figure 2 is a side-elevational view thereof with a part of the casing broken away showing some of the interior mechanism.

Figure 3 is a side view of the counter and the actuating means therefor which registers the number of fares of each different kind paid.

Figure 4 is a front view thereof.

Figure 5 is an elevational view of the motor and certain parts associated therewith.

Figure 6 is a side-elevational view of the motor driven shaft and parts mounted thereon.

Figure 7 is a view, partly in cross section, of the switch arms and operating means therefor shown in Figure 5.

Figure 8 is a top plan view of the ticket receiving receptacle shown in Figure 16.

Figure 9 is a fragmentary cross sectional view of the upper part of the ticket receiving receptacle and cover therefor.

Figure 10 is a front view of the fare indicating tablets.

Figure 11 is a front view of the reciprocating gate and operating means therefor.

Figure 12 is an end view of the register which is placed beside the conductor, which register houses means to control the register shown in Figure 1.

Figure 13 is a cross sectional view of the operating handle for the controlling of the rotor.

Figure 14 is a cross sectional view through the conductor's register taken on the line 14—14 of Figure 15 looking in the direction of the arrows.

Figure 15 is a front elevational view of the right half of the conductor's register with the casing removed.

Figure 15A shows the hand lever locking solenoid.

Figure 17 is a diagrammatic view of the date printing means and the setting means therefor.

Figure 18 is a front elevational view of the setting means for the printing type showing the direction of travel and the zone in which the passenger embarks, as well as the feeding means for the tickets.

Figure 19 is a plan view of the peripheries of the contact drums.

Figure 20 is a view of the stationary contact members.

Figure 25 is a cross sectional view on the line 25—25 of Figure 26 of a modification of the zone selector and certain of the parts associated therewith.

Figure 26 is a front view thereof.

Figure 27 is an end view of the stationary contact plate shown in Figure 25.

Figure 28 is a front view thereof.

Figure 29 is an end view of the zone selector shown in Figure 25.

Figure 30 is a front view thereof.

Figure 1:
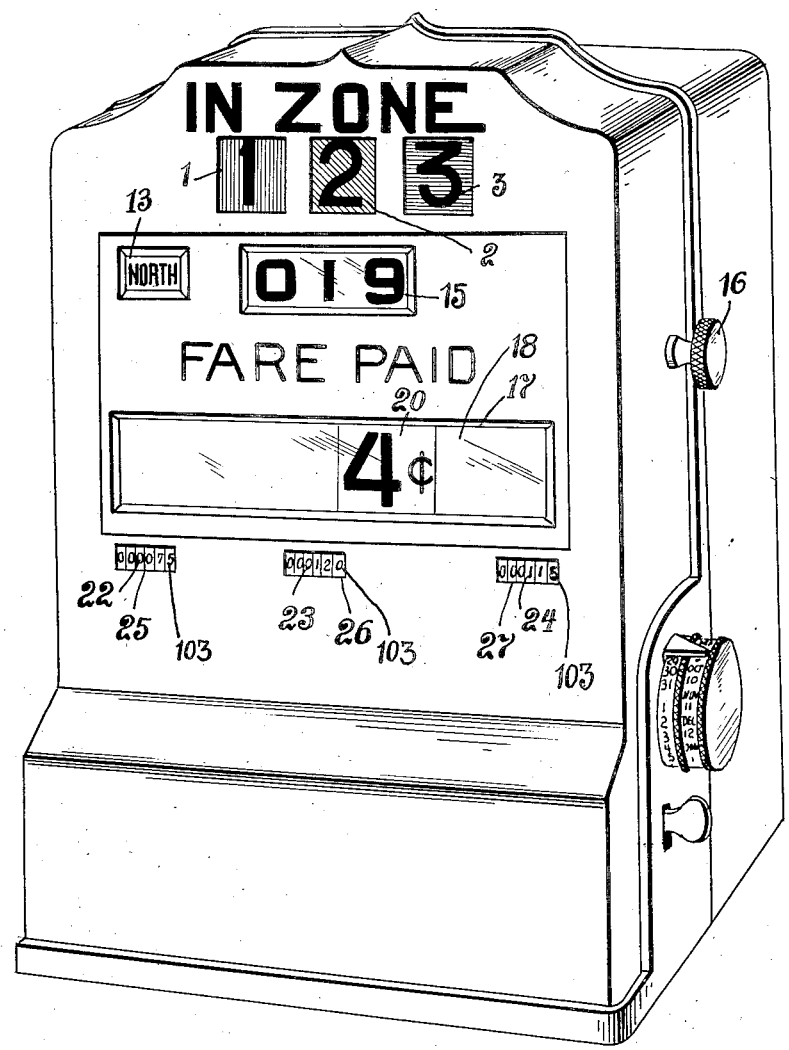

As shown in the drawings there are two registers. The register shown in Figure 1 will be referred to as the driven register and the register shown in Figure 14 will be referred to as the actuating register. The driven register shown in Figure 1 is substantially the same as the well-known Ohmer fare register which has for many years been in use on transportation lines. In connection with this driven register there are means to electrically operate the same, substantially as shown in the application of Grover C. Coil, Serial No. 462,978, filed June 23, 1930.

Near the top of the driven register transparent material such as glass is mounted in windows 1, 2, and 3 and on the glass or showing through the same are figures 1, 2, and 3. Above these windows there is a sign reading "In zone." This zone indicator may be separate from the register and may be mounted on top of the car or in any place where it might be desired to show to passengers or others the zone in which the car is at that time. Behind each of the windows there is an incandescent light 4 (Figure 2) which is in the circuit of the leads 5 and 6 (Figure 13) which leads communicate with spring contacts 7 and 8 which are mounted on an insulated plate 9 (Figures 12 and 13). The insulated plate 9 is in the shape of a regular polygon, having twice as many sides as there are zones on the line. On each of these sides the spring contacts 7 and 8 are mounted. The hand crank 10 (Figures 12, 13, and 15) is provided with a handle 11. Through the handle extends a spring pressed contact 12, the movement of which is limited by any conventional means not shown.

For the purpose of illustration I have assumed that there are only three zones on the line although there might be any number of such zones. Any end zone, such as the southernmost zone, I have called zone 1; the middle zone, zone 2; and the last one, such as the north end, zone 3. In stead of using 'South" and "North" any other designation could be used, such as "In" and "Out', "East" and "West", etc., which indicia appears in the sight opening 13 (Figure 1). The southernmost end of the line is zone 1 and regardless of which direction the car may be traveling this would still be zone 1. When traveling in this zone the crank handle 10 should be in its uppermost position, as shown in Figures 12, 13, and 15, and the spring contact 12 is engaging the contact 7 and pressing it against the contact 8, closing the circuit through the leads 5 and 6 which communicate with the light 4 which is directly behind the numeral 1 in the window 1. There are three such lights separated by compartments 14 (Figure 2). When the car passes into the second zone the hand crank 10 is rotated manually so that the contact 12 engages a spring contact 7B (Figure 12) which spring contact 7B is pressed against a contact similar to the contact 8 and closes a circuit leading to the incandescent light 4 which is behind the window 2 (Figure 1) showing that the car is now in zone 2. When the car passes into the third zone the crank 10 is manually moved so that the contact 12 will engage the spring contact 7C which, in like manner as described above, closes a circuit leading to the incandescent light 4 behind the window 3 showing that the car is now in the third zone. When the car reaches the end of its outward direction or its north bound travel and starts south it will still be in zone 3. The hand lever 11 is moved so that the contact 12 will engage a spring contact 7D which causes, as above described, the light behind the window 3 to be illuminated showing that the car is in zone 3. The same light is, therefore, lit whether the spring contact 12 engages the contact 7C or 7D. When the car now passes, in its south bound travel, to zone 2 the crank handle 10 is moved so that the contact 12 engages the spring contact 7E which causes the light behind the window 2 to be illuminated. The light behind the window 2 is therefore, illuminated when the hand lever 10 is in a position to cause its contact 12 to engage either the spring contact 7B or 7E. When the car now passes on its south bound travel into zone 1 the conductor moves the crank 10 so that the contact 12 engages the spring contact 7F which causes the light behind the window 1 to be illuminated. The light behind the window 1 is, therefore, illuminated regardless of whether the contact 12 engages the contact 7 or the contact 7F. If there are only three zones and the car runs from one end of the line to the other and back the conductor simply advances the hand lever 10 sixty degrees clockwise when passing from one zone to the next. In Figure 12 I have shown the various positions of the lever as 1N for the first position of the lever when traveling north, 2N as the second position of the lever 10 when traveling in the second zone going north, 3N as the position of the lever when in the third zone going north, 3S as in the third zone going south, 2S as in the second zone going south, and 1S as indicating the position of the lever when in the first zone going south. These designations, of course, do not appear on the machine but are simply inserted in the drawings for purposes of description.

In the driven register there is a sight opening 15 behind which are mounted drums to indicate the number of passengers which have boarded the car since the counter was last re-set by the knob 16. The mechanism to operate the consecutive counter and the re-setting means therefor are not described in this application as these means are well known in the art.

The driven register is also provided with a sight opening 17 which is provided with a pane 18 behind which appears tablets 19, 20 and 21. Only one of these tablets is projected into the position where it can be seen at one time and these tablets indicate the amount of fare paid by the passenger. Throughout the specification it is assumed that he pays 3¢ for riding in any one zone and 1¢ for each additional zone, so that if he gets on in one zone and is to get off in that same zone he pays 3¢. If he gets on in one zone and is going to the next zone he pays 4¢. If he gets on in one zone and is going to a third zone so that he will travel through three zones, he pays 5¢. Obviously these amounts may be changed to any other figure desired. The means for operating these tablets will be described hereinafter.

There are three sets of counters 22, 23, and 24 which are positioned behind sight openings 25, 26, and 27 respectively (Figure 1). The counter 22 records the number of 3¢ fares collected; the counter 23 records the number of 4¢ fares collected; and the counter 25 records the number of 5¢ fares collected. In other words, the counter 22 records the number of minimum fares paid, that is, for riding in one zone only, whereas the counter 23 records the number of fares paid for riding in two zones and the counter 24 records the number of fares paid for riding in three zones. To obtain the amount of money which the collector must turn in to the company it is only necessary to note the number of each kind of fare registered during the day's work and to multiply each of these figures by the unit of fare corresponding to that counter. The sum of these products gives the amount of money for which the conductor is held responsible.

Motor operating means

In Figures 2, 5, 6, 7, and 11 I have shown the motor operating means and in Figure 10 I have shown the tablets which are projected adjacent this sight opening 17. The motor operating means is driven by a conventional motor 28 which drives a worm 29 which meshes with and drives a worm gear 30 which is loosely mounted on a shaft 31, which gear 30 is provided with a sleeve 32 which has secured thereto a ratchet 33. The gear 30, sleeve 32 and ratchet 33 move as a unit and as they are loosely mounted on the shaft 31 they do not directly impart the rotation given by the motor to the shaft 31. The disk 34, cam disk 35, collar 36 and safety disk 37 are all secured together and are secured to the shaft 31 by means of a pin 38 which passes through an extension 39 of the collar 36 and the shaft 31 so that all of these parts move as a unit with the shaft 31. A pin 40 is mounted on the disk 34 and on this pin is pivoted a dog 41 provided with an extension or tail 42 which is engaged by one end of a lever 43 pivoted on a pin 44 mounted on the said disk 34. The lever 43 is provided with a slot 45 which receives a pin 46 carried by said disk 34. A spring 47 connects the said pin 46 to a pin 48 carried by the dog 41, which spring tends to rotate the dog 41 in an anti-clockwise direction as shown in Figure 5 so as to move the right hand end of the lever 43 outwardly and downwardly so that the nose 49 on the lever 43 will be engaged by a nose 50 carried by the lever 51. The upper end of the lever 51 is normally pulled against an extension 52 of the core 53 of the solenoid 54 by means of a spring 55. The lever 51 is pivoted on a shaft 56 and is provided with an off-set extension 57 which lies in the plane of the cam disk 35, as shown in Figure 7, which cam disk is provided with a cam 58. The disk 34 is bounded by a circle concentric with the shaft 31 except that it is provided with a cam 59 (Figures 5 and 7). The lever 60 is pivoted on a shaft 61 and carries a roller 62 which rolls on the periphery of the disk 34, being pulled toward the same by means of a spring 63. The shaft 31 has secured thereto a collar 64 to which is secured a crank arm 65 which carries a crank pin 66 (Figures 6 and 11).

When the solenoid 54 is energized, as hereinafter described, the core 53 moves upwardly so that the extension 52 is above the upper end of the lever 51 and the spring 55 pulls the upper end of the said lever 51 toward the right as viewed in Figure 5 so that the nose 50 on the said lever 51 is removed from engagement with the nose 49 on the lever 43. The spring 47 then rocks the dog 41 anti-clockwise as viewed in Figure 5 so that the dog will engage the ratchet 33. As the worm gear 30 is being driven by the worm 29, which is in turn driven by the motor, the ratchet 33 will now impart its rotation to the disk 34 which is secured to the cam disk 35 and the shaft 31 is thereby rotated, which shaft rotates the crank 65. The roller 62 now rides on the circumference of the disk 34 until the disk 34 has almost completed its revolution, when the cam 59 engages the roller 62 and moves the lever 60 to the left as viewed in Figure 7 and to the right as viewed in Figure 5 so that the upper end of the lever 60 engages a spring contact 67 and moves it into contact with the spring contact 68. While the cam 59 is passing the roller 62 the cam 58 engages the extension 57 of the lever 51, moving it downwardly and thereby rotating the lever 51 so that the nose 50 is in a position to be engaged by the nose 49 of the lever 43. Immediately thereafter the nose 49 of the lever 43 engages the nose 50 of the lever 51 and this engagement rotates the lever 43 slightly anticlockwise as viewed in Figure 5 so that the end of the lever 43 engages the tail 42 and rotates the dog 41 clockwise so as to disengage the dog from the ratchet 33. By this means the disk 34 and shaft 31 are released from all driving engagement with the motor 28 and the pin 46 by limiting the movement of the lever 43 positively stops the disk 34 and shaft 31 from rotation. It is, therefore, apparent that the shaft 31 can make one revolution and one revolution only before it is automatically disengaged from the motor and the said shaft 31 is positively stopped in the position in which it will be after it has made the one revolution. This, however, does not stop the motor. Means are provided to cut off the current supply to the motor at this point, as will be hereinafter described, but the motor is allowed to spin until it comes to rest so that the machine is not subjected to any strain by suddenly stopping the motor.

The crank pin 66 (Figures 6 and 11) is connected to a pitman 69 which is connected to a pin 70 carried by a reciprocating gate 71 which moves upwardly and downwardly in guides 72. The gate 71 is provided with a horizontal slot 73. It is also provided with a lip 74 (Figures 2 and 11). It will be noted that the crank arm 65 is normally extending straight downwardly below the shaft 31 and as the shaft 31 is given its one rotation the gate 71 is first raised and then lowered.

Secured to the gate 71 are solenoids 75, 76, and 77, there being as many such solenoids as there are zones. Each of these solenoids is provided with a core, the cores being denoted by the reference characters 78, 79, and 80 respectively. The solenoid 75 engages two wiper contacts 81 and 82 which are connected to leads 83 and 84 respectively. Each time a 3¢ fare is registered the circuit through the leads 83 and 84 are closed, as will be hereinafter described, so that the solenoid 75 is actuated so as to project the core 78 outwardly, or to the right as viewed in Figure 2, and beneath a lip 85 carried by a reciprocatable member 86 which has an outwardly extending arm 87 engaging beneath a lip 88 carried on the rear side of the tablet 19, which is the 3¢ tablet, thereby elevating the 3¢ tablet so that it can be seen through the sight opening 17. Only the upward movement of the gate 71 is imparted to the said tablet so that it is raised into position where it can be seen but the downward movement of the gate is not imparted to the said tablet. It is held in view by means well known in the art until the next tablet is exposed, at which time the tablet previously exposed is dropped. The means to accomplish this result being well known in the art it is not shown in this application for it forms no part of the invention herein described.

In like manner the solenoid 76 is connected to spring contacts 89 and 90 which are connected to leads 91 and 92 respectively and the circuit in which these leads form a part is closed and energized when a 4¢ fare is registered, in which case the solenoid 79 is projected beneath an arm similar to the arm 86 which is connected to the 4¢ tablet 20 (Figure 10). In like manner the solenoid 77 is connected to spring contacts 93 and 94 which are connected to leads 95 and 96 respectively which form a part of the circuit which will be energized when a 5¢ fare is registered so as to project the core 80 beneath a lip similar to the lip 85 carried by an arm similar to the arm 86 which actuates the 5¢ tablet. These solenoids, therefore, constitute selective operated means to govern which of the tablets is to be projected into view.

Each of the arms 86 is provided with a pin 97 which extends through a slot 98 in an arm 99 pivoted on a shaft 102. The arm of 99 carries a pawl 100 which engages a ratchet 101 mounted on the shaft 102 which actuates the units wheel 103 of a counter such as the counters 22, 23, and 24. Each time, therefore, a 3¢ fare is actuated the arm 86 will be raised and lowered which will actuate the 3¢ counter 22 while if a 4¢ fare is registered the counter 23 will be actuated and each time a 5¢ fare is registered the counter 24 will be actuated.

The actuating register

The actuating register is mounted at any convenient point in easy reach of the conductor. It is provided with hand levers 104, 105, and 106, or as many hand levers as there are zones. These hand levers extend through appropriate slots in the front of the casing 107 which is provided with an upper stop 108 and a lower stop 109. A side view of one of the hand levers is shown in Figure 14. It will be noted that each of these levers extends within the casing in the form of a plain bar 110 on which is mounted a pin 111 and a pin 112. A platen operating finger 113 is mounted on the pin 111 and this finger is provided with a toe 114 which engages the pin 112 and limits the downward movement of the finger 113, which finger is normally urged downwardly by means of a spring 115 attached to the upper end of the finger 113 and thence passing around the pin 111 and beneath the pin 112. The bar 110 which forms a part of the hand lever is secured to a plate 116 loosely mounted on a shaft 117. This plate carries a pin 118 which as the hand lever is being pulled downwardly toward this stop 109 engages the cam surface 119 of a latch 120 pivoted on a stud 121 carried by standards 122 mounted on the insulation block 123 which is attached to the base 124 of the machine. The latch 120 is provided with a pin 125 to which is secured a spring 126 connected to a fixed pin 127. As soon as the pin 118 has moved below the cam surface 119 the spring 126 pulls the nose 128 over above the pin 118 and locks the hand lever in its extreme downward position. It will be released by an electromagnet 129 which, when energized as hereinafter described, will pull downwardly on the bar 130 loosely mounted on the stud 121, which bar 130 is provided with a toe 131 which engages the pin 125 when the bar 130 is attracted by the electromagnet and will thereby move the latch 120 toward the right as viewed in Figure 14 disengaging the nose 128 from the pin 118.

The bar 110 forming a part of the hand lever also is provided with a contact finger 132 which is insulated from the hand lever by means of insulation 133. This contact finger, when the hand lever is depressed, engages contact fingers 134 and 135. In like manner the contact finger 140 on the hand lever 104 engages contact fingers 136 and 137 (Figure 16) and the contact finger 141 on the hand lever 106 engages contact fingers 138 and 139 as shown in Figure 15. This is diagrammatically shown also in Figure 24. The functions of the contact fingers 140, 132, and 141 is to close circuits which will cause the selected one of the solenoids 75, 76 or 77 to be actuated to indicate the fare paid and to register the same, as will be hereinafter described in regard to the electric circuits.

The plate 116 forming a continuation of the hand lever is provided with an extension 142 which carries a pin 143 to which is secured a spring 144 which is attached to a pin 145 mounted on an insulation block 146 which is mounted on the base 124. This spring holds the hand lever in its upper position against the stop 108 unless the operator manually holds the lever down or it is being held down by the latch 120.

This plate 116 is provided with a rack 147 which engages a broad pinion 148 mounted on a shaft 149, which pinion engages and drives a pinion 150 mounted on a shaft 151. The shaft 151 has secured thereto a feed roller 152 which engages a feed roller 153. Between these feed rollers passes a strip of paper 154 which is unwound from a supply roll 155 mounted on a shaft 156. The paper, after leaving the roller 155, passes over a guide or shaft 157 from whence it passes between the feed rollers and over a stationary knife 158 and from thence over a continuous ribbon 159, which ribbon may be intermittently fed by any conventional means. After passing beyond the ribbon it passes between guides 160 which conduct it through an opening 161 on to a platform 162 from whence the passenger takes his ticket or receipt.

When the operating handle 104, 105 or 106 is raised upwardly it is obvious that the upper feed roller, such as the roller 152, would be reversely rotated and this movement should not be transmitted to the paper strip. It is, therefore, necessary to provide means to lower the bottom feed roller, such as the roller 153, so that this reversed feeding movement would be ineffective so far as the paper strip is concerned. This is accomplished by mounting the lower feed roller on a shaft 163 which is secured to an arm 164 of a lever 165 pivoted on a shaft 166. The lever 165 is provided with a lower arm 167 which carries a roller 168. The plate 116 is provided with a rib 169 concentric with the center of the shaft 117. This rib is provided with a cam surface 170 on its right hand end as viewed in Figure 14 and with a cam surface 171 on the left hand end thereof. A dog 172 is pivoted on a pin 173 carried by the plate 116 and the lower end of this dog carries a pin 174 to which a spring 175 is attached which is secured to a pin 176 also carried by the plate 116. As the hand lever is pulled downwardly it is obvious that the upper surface of the rib 169 would ride underneath the pin 168. When the hand lever is completely depressed the rib 169 would have moved beyond the roller 168 so that the lever 165 would drop by gravity or by means of a spring 181 (Figure 12) so as to disengage the lower feed roller from the upper feed roller. Any conventional means may be provided to limit the downward movement of the lever 165. As the hand lever is now moved toward the stop 108 the cam surface 170 will engage the roller 168 thereby forcing the roller 168 beneath the lower surface of the rib 169 positively holding the lower feed roller out of engagement with the upper feed roller. Just prior to the time the hand lever reaches the stop 108 the roller 168 will engage the upper end of the dog 172 rotating it counter-clockwise as viewed in Figure 14 and passing between the upper end of the dog and the cam surface 171 carried by the rib 169. As soon as it has passed between these members the spring 175 snaps the dog 172 back into position as shown in Figure 14 so that the upper surface of the dog 172 which meets the upper surface of the rib 169 will force the roller 168 to travel over the upper surface of the rib 169 when the hand lever is again depressed, thereby forcing the lower feed roller into engagement with the upper feed roller.

One of the many means which might be used to limit the up and down movement of the lever 165 is shown in Figure 12 in which the shaft 163 which carries the lower feed roller extends through a slot 176 in the wall 177. The shaft 163 is connected to a lever 178 mounted on the shaft 166, which lever has an extension 179 which carries a pin 180 to which is connected a spring 181 secured to a fixed pin 182. The upper and lower ends of the slot 176 limit the upward and downward movement of the shaft 163 and the spring 181 tends to pull the shaft downwardly so as to cause the roller 168 to pass beneath the rib 169 while the pawl 172 and the cam surface 171 positively force the shaft 163 upwardly just prior to the time that the hand lever is returned to its uppermost position against the stop 108.

The platen operating finger 113 carried as above mentioned by the hand lever is provided with a downwardly extending toe 183 adapted to engage an extension 184 of a platen lever 185 which carries a platen hammer 186. When the hand lever has been lowered almost to its lower limit so that the toe 183 engages the extension 184 the hammer 186 is raised and as the surface of the extension 184 which is in engagement with the toe 183 is thus rotated anti-clockwise it forms a cam surface which permits the toe 183 to slide off of the same so that the hammer is now released. It now falls by gravity or by means of a spring 305 so as to engage the paper strip 154 against the ribbon 159 and press the ribbon against the printing members carried by the shaft 166, thereby printing certain indicia on the ticket and simultaneously bringing the movable knife 187 into engagement with the fixed knife 158 thereby severing the ticket. The passenger can now pick up the part of the ticket extending over the platform 162 and thereby remove his ticket from the machine. The lever 185 is provided with an extension 303 which normally engages a spring pressed plunger 304 so as to hold the hammer out of engagement with the paper when the hammer is released. Its momentum then causes the printing to be performed and immediately thereafter the spring pressed plunger 304 raises the hammer out of engagement with the paper or ribbon.

Figure 16:
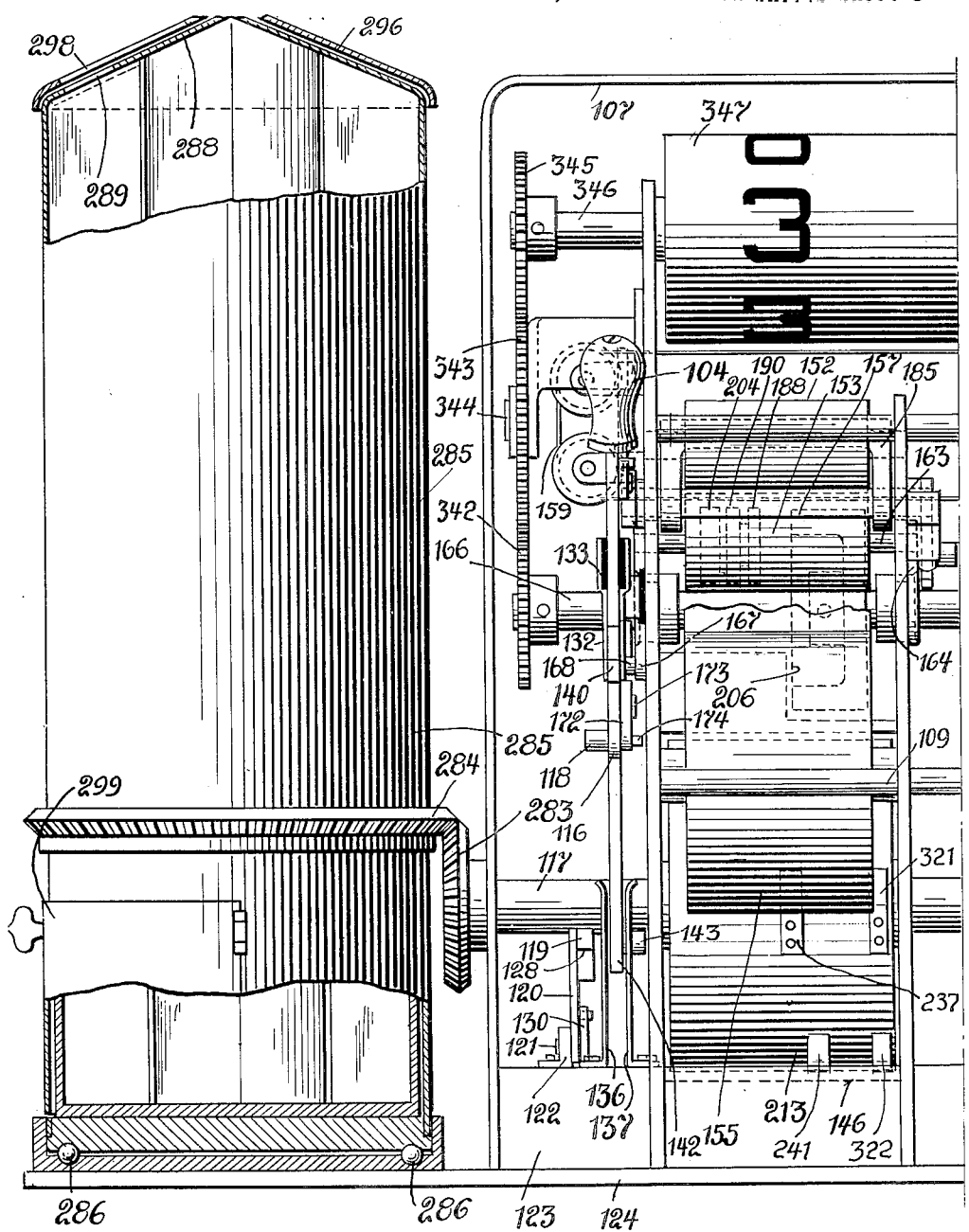
Figure 16 is a front view of the left half of the conductor's register with the casing removed, which view also shows the ticket receptacle.
Figure 21:
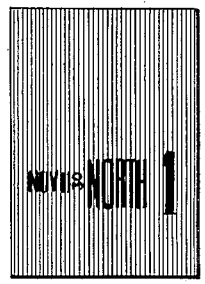
Figures 21, 22 and 23 show the tickets as issued by the machine.
Figure 22:
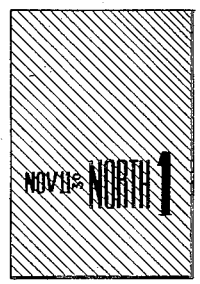
Figure 23:
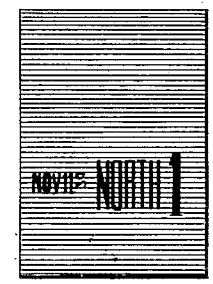

As shown in Figures 15 and 16 there are three such hand levers, or as many levers as there are zones, and each of these hand levers is connected with mechanism similar to that described above. If, therefore, the operator pulls downwardly on the hand lever 104 he issues a ticket from one paper supply roll, whereas if he pulls down on lever 105 he issues a ticket from another supply roll and if he pulls down lever 106 he issues a ticket from a third paper supply roll. There are, therefore, as many supply rolls of paper as there are zones and the paper on each of these supply rolls is differently colored. For instance, the ticket that will be issued by pulling down on the lever 104 would be red such as the ticket shown in Figure 21 while the ticket issued by pulling down the lever 105 would be green as shown in Figure 22 and the ticket that would be issued by pulling downwardly on lever 106 would be blue as shown in Figure 23. The operator uses the levers 104, 105 and 106 according to the destination of the passenger. If, therefore, the conductor is commencing his run going north in zone 1 he will pass through zones 1, 2 and 3. If a passenger gets on the car whose destination is zone 1, the conductor will pull down on lever 104 and will issue a red ticket as shown in Figure 21, whereas if the passenger is going to zone 2, the conductor pulls down on lever 105 which will issue a green ticket as shown in Figure 22 and if the passenger is going to zone 3, the conductor will issue a blue ticket by pulling down on lever 106, which ticket is shown in Figure 23. The color of these tickets, therefore, indicates the destination of the passenger. When the conductor passes into zone 2 if a passenger gets on whose destination is zone 2 he would pull down on lever 105 and issue the green ticket shown in Figure 22, whereas if a passenger gets on in zone 2 going into zone 3 he would pull down on lever 106, issuing a blue ticket as shown in Figure 23. When a passenger gets on in zone 3 going north he cannot pass through any zone except the zone in which he is at that time, which is zone 3, and the conductor would, therefore, pull down on lever 106 and issue to him a blue ticket as shown in Figure 23. The indicia printed on these tickets may be changed in the various zones but it is essential that it be remembered that the color of the ticket indicates the zone to which the passenger has paid his fare. The color of the ticket does not shown the amount of money paid or the number of zones through which the passenger will pass. The color indicates destination only.

The indicia printed on the ticket is the date, which prevents the passenger using that ticket on another day, the direction of travel, such as "In" and "Out" or "North" and "South", and the zone in which the passenger entered the car.

The means to set up the date is shown in Figure 17 in which the year printing wheels 188 are set up at the beginning of the year. These wheels are manually set and are secured to shafts 189. The date printing wheels 190 are mounted on sleeves 191 which carry gears 192 which mesh with gears 300 mounted on short shafts 301 (see Figure 14) and which gears 300 mesh with gears 193 secured to a shaft 194 which is driven by a gear 195 which meshes with and drives the left hand gear 193 as shown in Figure 17. The gear 195 is mounted on a sleeve 196 which is secured to a hand knob 197 in reach of the conductor so that as the conductor rotates the hand knob 197 he simultaneously sets all of the date printing wheels 190. The conductor can also reach a setting knob 198 secured to a shaft 199 on which three gears 200 are mounted, which gears mesh with and drive gears 201 loosely mounted on the shaft 194, which gears mesh with gears 302 on short shafts 301 and which gears 302 mesh with gears 202 secured to sleeves 203 to which the month printing wheels 204 are secured.

The type to print the direction of travel and the zone in which the passenger entered the conveyance are mounted on printing surfaces 205 as shown in Figure 14. There are twice as many such printing surfaces as there are zones; that is, in the present instance there are six such printing surfaces. Only the upper one of these printing surfaces directly beneath the ribbon 159 will be effective to print. These printing surfaces are mounted on three disks 206, 207 and 208 as shown in Figures 15, 16, and 18. Each of these disks is secured to the shaft 166 which has secured thereto a gear 209 which is driven by an idler gear 210 mounted on a shaft 211, which idler gear 210 meshes with and is driven by a gear 212 secured to the shaft 117 to which is secured the hand crank 10. The printing type is arranged on the three disks 206, 207, and 208 in identical manner; that is, what appears on one appears on the other also. With the hand crank 10 being in its upper position as shown, the print-ink type that would appear on the uppermost printing surface 205 of each of the disks 206, 207, and 208 would be "North 1" showing that the direction of travel was north and the passenger got on in zone No. 1, a position which exactly corresponds to the setting of the hand crank 10. When the car passes into zone 2 going north the hand crank 10 as before described would be moved to its "2N" position and the printing type that would be thereby brought into position would be "North 2" on each of the disks. When the car passes into the third zone the printing type would be changed to "North 3" because the hand crank would be moved into the "3N" position shown in Figure 12. When the car starts south the hand crank would be moved into the "3S" position and the printing type would thereby be rotated so as to print "South 3" showing that the passenger entered the car going south while the car was in zone 3. It is, therefore, obvious that the color of the ticket shows the destination of the passenger while the indicia on the ticket indicates the date, the direction of travel and the zone in which the passenger entered the car. The printing surface of the types 204, 190, and 188 and the types on the disks are in alignment with each other as shown in Figure 15.

*Controlling means for the electric circuits*

As before mentioned, the hand crank 10 is secured to the shaft 117 and on this shaft are secured three disks 213, 214 and 215. The circumferences of these disks are shown in plan in Figure 19. In making such a plan view it would be assumed that the disk 214, shown in Figure 14, as well as the other disks, was cut on the line 216 (Figure 14) and unrolled and laid flat. In alignment on the three disks would be insulated contacts 217, 218, and 219 which, when the hand crank 10 is in its upper position, denote that the car is in zone 1 going north; that is, contacts 217, 218 and 219 will be in engagement with contacts carried by the insulation block 146 as follows:

The contact 217 will engage terminals 220 and 221. The contact 218 will engage terminals 222 and 223 and the contact 219 will engage terminals 224 and 225. When the hand crank 10 is rotated to its "2N" position as shown in Figure 12 denoting that the car is now in the second zone going north the three disks 213, 214, and 215 will be correspondingly rotated so as to bring the contact 226 on the disk 214 into engagement with the terminals 227 and 228 carried by the insulation block 146 and the contact 229 will be brought into engagement with the terminals 230 and 231 carried by the insulation block 146.

There will be no contact plate on the disk 213 which will close any circuits. When the hand crank 10 is rotated to its "3N" position as shown in Figure 12 showing that the car is now in the third zone going north the three disks will be rotated correspondingly so as to bring the contact 232 on the disk 215 into engagement with the terminals 233 and 234 mounted on the insulation block 146. When the hand crank 10 is rotated into its "3S" position shown in Figure 12 showing that the car is in the third zone going south the three disks 213, 214, and 215 will be correspondingly rotated so that the contact 235 will be brought into engagement with the terminals 233 and 234 described above. Also the contact 236 will be brought into engagement with the terminals 222 and 223 described above. The contact 237 will be brought into engagement with the terminals 238 and 239 carried by the insulation block 146. When the hand crank 10 is moved to its "2S" position shown in Figure 12 showing that the car is in the second zone going south the contact 240 carried by the disk 214 will be brought into engagement with the contacts 227 and 228 described above and contact 241 carried by the disk 213 will be brought into engagement with the terminals 242 and 243 carried by the insulation block 146. When the hand crank 10 is rotated to its "1S" position showing that the car is in the first zone going south the three disks 213, 214, and 215 will be correspondingly rotated, bringing the contact 244 into engagement with the terminals 220 and 221 described above.

Electric circuits

A lead 245 is connected to any suitable source of electric energy 246 and the lead extends to a resistance coil 247. From a part of the resistance unit where the current had been sufficiently reduced by resistance a lead 248 extends to a spring contact 249 (Figures 11 and 24), which spring contact is immediately above the solenoid core 53. Adjacent the spring contact 249 is a spring contact 250 from which a lead 251 extends to the motor 28 and from the motor there is a lead 252 which extends to the ground 253. When the solenoid 53 is actuated it is obvious that it would press the spring contact 249 against the spring contact 250, completing the circuit and energizing the motor which as above described would make one revolution. After it has made the one revolution the solenoid 54 will be de-energized as will be hereinafter described and the spring 254 Figure 5 will retract the solenoid core 53 thereby breaking the circuit so that the power to the motor will be cut off.

A lead 255 extends from a point on the resistance coil where the electrical energy would be low, which lead is connected to a lead 256 which is connected to the coils of the solenoid 54. A lead 257 extends from the solenoid 54 and is connected by leads 258, 259, and 260 to the spring contacts 136, 134 and 138 heretofore described and shown in Figures 24, 14, 15, and 16. Leads 261, 262, and 263 extend from the spring contacts 137, 135, and 139 respectively. The lead 261 is connected to all three of the contacts 221, 239, and 243. The lead 262 is connected to both of the contacts 223 and 228 and the lead 263 is connected to all three of the contacts 225, 231, and 234. Leads 265, 266, and 267 extend from the contacts 220, 227, and 233 respectively and each of these leads is connected to a lead 268 which is connected to the lead 83 heretofore described and shown in Figures 24 and 11. Leads 269, 270, and 271 extend from the contacts 242, 222, and 230 respectively, which leads all connect to a lead 272 which is connected to the lead 91 heretofore described. Leads 273 and 274 extend from the contacts 238 and 224 respectively, which leads are connected to a lead 275 which is connected to the lead 95 heretofore described. The leads 84, 92, and 96 are connected to a lead 276 which is connected to a lead 277 which extends to the ground 278.

Figure 24:
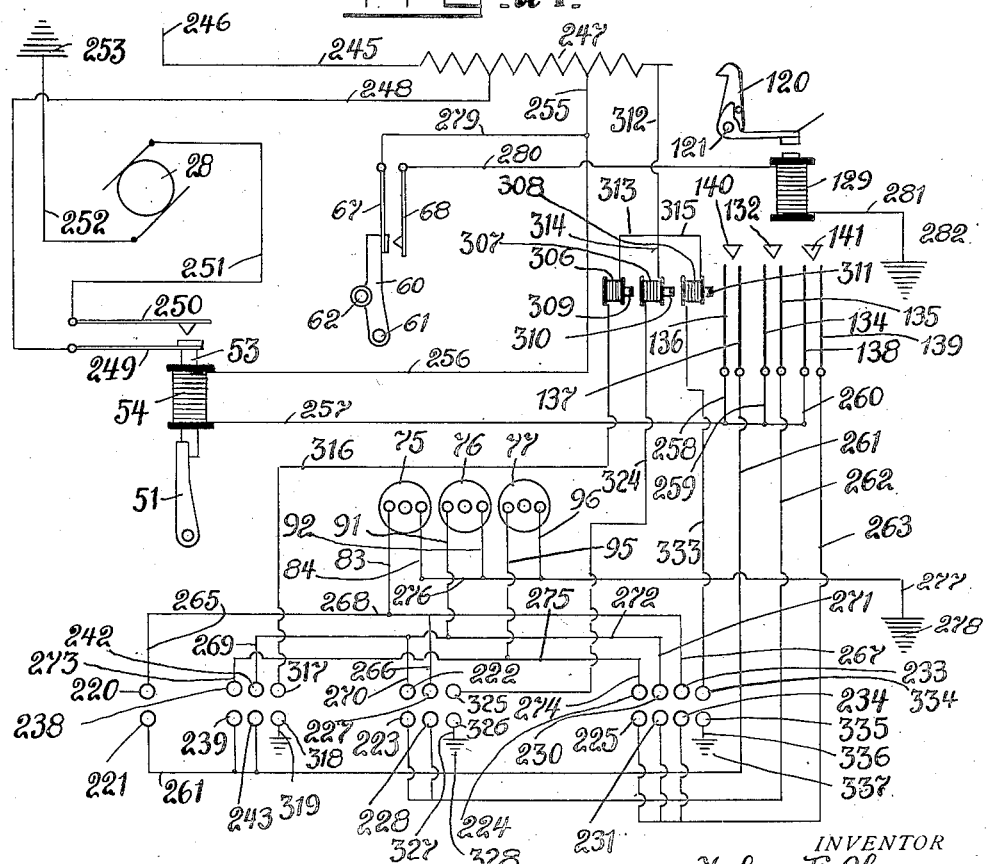
Figure 24 is a diagrammatic view of the electric circuits.

The lead 255 is connected to a lead 279 which is connected to a spring contact 67 (Figures 5 and 24), which it will be remembered is adjacent the lever 60 which is moved to the right as viewed in Figures 5 and 24 just prior to the time that the motor driven disk 34 completes its single revolution thereby moving the spring contact 67 into engagement with the spring contact 68 from whence extends a lead 280 connected to the electromagnet 129 (Figures 4 and 24) from whence extends a lead 281 which goes to the ground 282.

Locking means

As above mentioned, the levers 104, 105, and 106 print a ticket showing by its color the destination of the passenger. Obviously when the car has passed such a destination the conductor should not operate that lever. For instance, if the car has already passed zone 1 going north and is now in zone 2 the conductor should not operate the lever 104 and when the car is in zone 3 going north the conductor should not operate levers 104 or 105. I have provided means which will prevent the operation of any lever corresponding to a zone which the car has already passed through. This means consists of solenoids 306, 307, and 308, there being one solenoid for each lever employed. When for any reason the circuit associated with any one of the said solenoids is interrupted the cores 309, 310, and 311 of the solenoids 306, 307, and 308 respectively engage the plates associated with the levers 104, 105, and 106 and hold said levers in elevated position. A lead 312 extends from the extreme end of the resistance coil 247 and is connected with the coils of the solenoids 306, 307, and 308 by means of leads 313, 314, and 315 respectively. From the solenoid 306 a lead 316 extends to a terminal 317 on the insulation block 146. A terminal 318 is also mounted directly beneath the terminal 317 and from this terminal extends a lead 319. Both of the terminals 317 and 318 are positioned so that the contacts 320, 321, 322, and 323 on the drum 213 will be brought into engagement with said terminals when the drum 213 is rotated. The contact 320 occupies the same peripheral position as the contact 217 and the contact 321 is beside the contact 237, the contact 322 is beside the contact 241 and the contact 323 is in peripheral alignment with the contact 244. A lead 324 extends from the solenoid 307 to a terminal 325 which is directly above a terminal 326, both of which terminals are on the insulation block 146. A lead 327 extends from the contact 326 to the ground 328. The contacts 325 and 326 are so positioned that each of the four contacts 329, 330, 331, and 332 carried by the drum 214 will engage both of said contacts when the drum 214 is rotated. The contact disks 329, 330, 331, and 332 are positioned on the drum 214 in peripheral alignment with the contact 218, 226, 236, and 240 respectively. A lead 333 extends from the solenoid 308 to a terminal 334 which is positioned directly above a terminal 335, both of which terminals are mounted on the insulation block 146. A lead 336 extends from the terminal 335 to the ground 337. The contacts 334 and 335 are positioned so that each of the contacts 338, 339, 340, and 341 carried by the drum 215 will engage both of said terminals when said drum 215 is rotated. From the above description it will be obvious that the circuits associated with the solenoids 306, 307, and 308 will be closed only when the drums 213, 214, and 215 are in position to complete circuits to register fares. There are no contacts on the drum 213 corresponding to the positions "2N" or "3N" of the crank 10 (Figure 12) and hence when said crank 10 is in either of said positions the circuit through the solenoid 306 will be opened so that its solenoid 309 locks the lever 104 against operation. It, therefore, appears that on the north bound travel the lever 104 is locked against operation after we have passed through zone 1 going north but it is not locked against operation in zone 1 going north or in any of the zones going south. In like manner the lever 105 is locked against operation when in the third zone going north or in the first zone going south. In like manner the lever 106 is locked against operation in the second and first zones going south.

*Means to indicate the proper fare to any zone*

If there are a large number of zones the conductor might make mistakes as to the proper amount of fare to be collected from the zone in which the car is at that time to any succeeding zone. I have, therefore, provided means to visibly indicate to him the proper fare to be collected to any given destination. It will be remembered that the hand crank 10 is rotated to its next succeeding position when the car passes into the next succeeding zone and that the shaft 166 is correspondingly rotated. On the left hand end of this shaft as viewed in Figure 16 is secured a gear 342 which meshes with and drives a gear 343 mounted on a stud shaft 344, which gear meshes with and drives a gear 345 secured to a shaft 346 which carries a plurality of drums or one long drum 347 which is directly behind a sight opening 348 (Figure 14). The drum 347 (Figures 14, 15, and 16) is, therefore, directly connected to the crank 10 and rotates therewith. As viewed in Figures 15 and 16 there are characters "3", "4", and "5" directly behind the sight opening 348. In this view it will be remembered that the car is in the first zone going north. If the lever 104 is operated the conductor should collect 3¢ for a ticket will be issued from zone 1 good only in zone 1, whereas if the lever 105 is operated it will issue a ticket from zone 1 to zone 2 and the numeral "4" just above and to the right of the said lever 105 shows to the conductor that 4¢ should be collected, while if the lever 106 is operated a ticket is issued from zone 1 to zone 3 and the fare is 5¢, which figure appears just above and to the right of the lever 106. When the crank 10 is moved to its "2N" position the drum 347 will be rotated so as to bring into view the indicia "034" which shows to the conductor that he should not attempt to operate the lever 104 and that if he operates the lever 105 he should collect 3¢, while if he operates the lever 106 he should collect 4¢. When the crank 10 is in its "3N" position the indicia that will appear behind the sight opening 348 will be "003" showing to the conductor that the only lever that he should operate would be the lever 106 and the fare should be 3¢. When the crank 10 is in its "3S" position, or third zone going south, the numeral "3" would appear adjacent the lever 106 and the numeral "4" would appear adjacent the lever 105, while the numeral "5" would appear adjacent the lever 104. When the crank 10 is in the "2S" position denoting the second zone going south a "0" would appear above the lever 106, a "3" above the lever 105 and a "4" above the lever 104. When the crank 10 is in the "1S" position denoting that the car is in the last zone going south zeros would appear adjacent the levers 106 and 105 and "3" would appear above the lever 104. It, therefore, appears that regardless of the direction of travel the fare from the zone in which the car then is to any other zone is automatically indicated to the conductor so that he will have no calculation whatsoever to make and thereby errors will be reduced to a minimum. This is a fraud preventive device also for the passenger is likewise shown the amount of fare which he should pay so that the conductor will thereby be prevented from overcharging the passenger.

*Ticket receptacle*

It will be remembered that the hand crank 10 is secured to the shaft 117 and as shown in Figure 16 this shaft 117 has secured thereto a bevel gear 283 which meshes with a ring bevel gear 284 mounted on a rotatable drum 285 which is supported by balls 286. This rotatable drum is divided into twice as many compartments as there are zones by means of partitions 287 (Figure 8). A part of the upper portion of the drum is covered by a plate 288, which plate extends from the center of rotation for approximately three-fourths of the distance to the circumference of the drum leaving openings 289 into which the tickets can be dropped. This upper plate 288 is provided with different colors so that the distance between two of the partitions 287 would be a red sector 290, whereas the next would be a green sector 291, the next would be a blue sector 292, the fourth would be a blue sector 293, the fifth would be a green sector 294, and the sixth would be a red sector 295. This plate 288 lies immediately beneath a stationary plate 296 supported by a standard 297 secured to any fixed part of the car. This plate 296 has a cut-away portion 298 which exactly corresponds to the shape of one of the sectors lying between the partitions 287. The passengers' exit causes the passenger to pass by this ticket receptacle and he must deposit his ticket in the receptacle. Since there is only one opening 298 in the plate 296 and since the rotatable receptacle 285 directly beneath it rotates in unison with the setting of the hand crank 10 denoting the zone in which the car is at that time, it is obvious that if the car is then in zone 1, which is the zone carrying red destination tickets, the sector 290 would be visible through the opening 298 and the only place that the passenger could deposit his ticket would be in the opening 289 extending between the red sector 290 and the periphery of the rotatable drum. The partitions 287 guide this ticket downwardly so that it is impossible to get this red ticket going north in any other compartment. When the car passes into zone 2 the drum is rotated so that the sector 291 appears beneath the opening 298 and it is likewise impossible for the passenger to deposit his ticket in any opening other than the opening 289 extending between the green sector 291 and the periphery of the drum. If a passenger presents a red ticket which was good only for zone No. 1 to the conductor when he gets into zone 2, which is the green zone, the attention of the conductor would at once be secured because there is a glaring difference which exists between the color of the ticket presented and the color of the ticket which should be presented, which color is shown on the sectors directly before the conductor and the passenger.

Any suitable means may be provided to remove the tickets such as by having a small receptacle in the bottom of the rotatable receptacle which is in alignment with partitions 287, which small receptacle could be removed through the door 299.

In Figures 25 to 30 inclusive I show a modification of my invention in which I have substituted a laterally movable contact plate for the rotatable contact disks 213, 214 and 215 and in the modified structure the amount of fare which should be collected is shown by a plate directly connected to the contact plate thereby eliminating the drum 347. The contact plate 349 is provided with a handle 350 which the conductor can grasp so as to move the said contact plate laterally within the base 351 of the housing 352. This base 351 is provided with contacts 353, 354, 355, 356, 357, 358, 359, 360, and 361 which correspond to the contacts on the drums 213, 214, and 215 respectively. A lead 362 extends from the contact 353, which lead corresponds to the lead 265 heretofore described connected to the 3¢ solenoid 75. A lead 363 extends from the contact 357, which lead corresponds to the lead 91 heretofore described connected to the 4¢ solenoid 76. A lead 364 extends from the contact 361, which lead corresponds to the lead 95 heretofore described connected to the 5¢ solenoid 77. The contact plate 347 is provided with contacts 365, 366, and 367 as shown in Figure 30 which are connected to suitable leads not shown which correspond to the leads 261, 262, and 263 heretofore described. A plate 368 is connected to the contact plate 347 which plate appears directly behind a sight opening 369 and on which plate appear the characters "3", "4", and "5" showing the amount of money to be collected. When the contact plate is inserted all of the way into the housing the contact 365 engages the contact 353, the contact 363 engages the contact 357 and contact 367 engages the contact 361 so that if lever 104 is actuated a 3¢ fare will be recorded and a corresponding ticket issued, while if the lever 105 is operated a 4¢ fare will be recorded and a corresponding ticket issued, while if the lever 106 is operated a 5¢ fare will be recorded and a corresponding ticket issued. The amount of fare to collect is shown on the plate 368. When the car reaches the beginning of the second zone going north the conductor grasps the handle 350 and pulls the contact plate 347 to the right until the contact 365 engages the contact 356 and the contact 366 engages the contact 360. This also brings the numeral "3" into position where the 4 appears in Figure 26 and Figure 5 passes behind a blind 370 so that it cannot be seen. A lead 371 extends from the contact 356, which lead corresponds to the lead 266 heretofore described connected to the 3¢ solenoid 75 so that if the lever 105 is operated a 3¢ fare will be registered and a corresponding ticket issued. A lead 372 extends from the contact 360, which lead corresponds to the lead 271 heretofore described connected to the 4¢ solenoid 76 so that if the lever 106 is operated a 4¢ fare will be recorded and a corresponding ticket issued.

When the car reaches the beginning of the third zone the conductor manually pulls the contact plate 347 to the right so that the contact 365 engages the contact 359 while the contacts 366 and 367 would engage nothing. This movement brings the figure "3", showing the amount to be collected, adjacent the lever 106. A lead 373 extends from the contact 359, which lead corresponds to the lead 267 heretofore described connected to the 3¢ solenoid 75 so that a 3¢ ticket would be issued and a 3¢ fare recorded. When the end of the line is reached a contact plate similar to the contact plate 347 would be inserted except that when the contact plate is fully inserted showing that we are in the third zone going south the contact 367 would engage the contact 359 while the contact 366 would engage the contact 367 and the contact 365 would engage the contact 355. The operation on the return trip would be identical with that described above.

The slide plate 347 is provided with grooves 374 which insert a tongue 375 carried by the base 351 and a similar tongue carried by the opposite wall of the casing so as to guide the contact plate.

Operation

Let us assume that the conductor is commencing his north bound run and there are three zones. The car is, therefore, in zone 1 and the conductor sets the hand crank 10 to its "1N" position shown in Figure 12. The incandescent bulb behind the window 1 (Figure 1) is illuminated by means of the circuit passing through the contact 7 and 8 being closed. As each passenger gets on the passenger tells the conductor the destination to which he desires to ride. There could, of course, be any number of zone destinations but for the purpose of illustration we have made a machine capable of registering only three destinations although this number could be increased by any number. The contact 320 is in engagement with the terminals 317 and 318 while the contact 329 is in engagement with the terminals 325 and 326 and the contact 338 is in engagement with the terminals 334 and 335 so that the circuits connected to the solenoids 306, 307 and 308 are energized and the cores 309, 310, and 311 are withdrawn from locking engagement with the levers 104, 105, and 106 respectively so that any one of these levers can be operated. If the passenger is going to zone 1 the conductor pulls downwardly on the lever 104 and a ticket such as shown in Figure 21 is issued to him. This is accomplished as follows: As the lever is pulled down the rack 147 rotates the gear 148 which rotates the gear 150 which operates the feeding mechanism which feeds the ticket forward and into a position where it can be printed on and can be grasped by the passenger so as to be removed from the machine. As the hand lever completes its downward movement the finger 183 raises a movable knife and hammer and thereafter releases the same so that a hammer blow is imparted to the paper which is pressed against the ribbon and the ribbon is pressed against the type, printing the impression on the paper and simultaneously severing the paper from the unprinted strip. When the downward movement of the lever 104 has been almost completed the contact finger 140 engages the fingers 136 and 137. The contact 217 (Figure 19) engages the terminals 220 and 221 so that the electrical system operates as follows: As shown in Figure 24 the current is received from any suitable source of electric energy, such as 246, from whence it passes through the lead 245 to the resistance coil 247. It now passes through the lead 248 to the spring contact 249 which is now closed and from thence through the contact 250 and lead 251 to the motor 28. The lead 252 connects the motor 28 to the ground 253. The spring contact 249 is pressed against the spring contact 250, as above mentioned, by the operation of the solenoid 54, which solenoid is closed by the current passing through the leads 255 and 256 connected to the solenoid windings and a lead 257 leads from the solenoid to the lead 258 connected with the spring contact 136. The contact finger 140 is engaging the contact fingers 136 and 137 so that the current now passes to the lead 261 which is connected to the terminals 221, 239, and 243, which terminals it will be remembered are adjacent the disk 213. On this disk there is only one contact which connects any of these terminals and that is the contact 217 which connects the terminals 221 and 220 so that the only circuit which will be closed will be the circuit which includes the terminals 220 and 221. The lead 265 leads from the terminal 220 to a lead 83 connected to the windings of the solenoid 75 so that this solenoid alone is actuating and the core 78 is projected beneath the lip 85 (Figure 2) so that as the motor makes its one revolution and the gate 71 is raised and lowered the arm 86 corresponding to tablet 19 (Figure 10 will be raised, bringing the numeral "3¢" into view behind the opening 17 (Figure 1). This upward movement of the arm 86 operates the 3¢ counter 22.

It, therefore, follows that if the conductor has positioned his hand crank 10 when he commences his run the only thing that he has to do thereafter while in zone 1 to issue a ticket as shown in Figure 28 and good only for zone 1 is to pull down on the hand lever 104 and this shows everyone in the car that 3¢ has been collected while the machine at the same time registers this 3¢, prints, severs and issues a ticket showing by the color of the ticket the destination of the passenger and by the indicia printed thereon the date, the direction of travel and the zone in which the passenger entered the car.

Precisely the same thing would occur if the passenger desired to go to zone 2 instead of zone 1 except that the conductor would pull down on the hand lever 105 instead of the hand lever 104 and a 4¢ fare would be registered instead of a 3¢ fare. A 4¢ tablet 20 would be projected into view and a ticket such as that shown in Figure 22 would be issued. The electric circuits for the operation of the motor as shown in Figure 21 would be the same as that heretofore described but the current passing through the lead 257 would no longer pass through the contacts 136 and 137 but would pass through the lead 259, contact 134, contact finger 132 carried by the lever 105, contact 135 and lead 262 which communicates with the terminals 223 and 228 which are adjacent the disk 214 (Figure 19). There is nothing to connect the terminal 228 to the terminal 227 and the current would pass from the terminal 223 through the contact 218 to the terminal 222 from whence it passes through the lead 270 to the lead 91 connected to the solenoid 76, projecting its core beneath the toe 85 of the arm 86 connected to the 4¢ tablet 24 and operating the 4¢ counter 23.

Precisely the same operation would occur if the passenger desired to go to zone No. 3 but in this case the current passing through the lead 257 would pass through the lead 260 to the spring contact 138, contact finger 141 carried by the lever 106, contact finger 139 and lead 263 which is connected to terminals 225, 231 and 234, which terminals are adjacent the disk 215. In this position of the disk 215 there is only one contact, designated by the reference character 219 and this contact connects the terminal 225 to the terminal 224 from whence the lead 275 extends, which communicates with the lead 95 connected to the 5¢ solenoid 77. The core of this solenoid is now projected so as to actuate the 5¢ tablet 21 and to actuate the 5¢ counter 24.

The car continues its north bound travel and now enters zone 2. The conductor rotates the hand crank 10 to its "2N" position shown in Figure 12, which correspondingly rotates the drums 206, 207 and 208 so as to bring the printing characters "North 2" into printing position and the light behind the window 2 is illuminated showing that we are now traveling in zone 2. Also, the drum 285 is rotated so that while we are traveling in zone 2 the green sector 291 appears beneath the opening 298 showing to the conductor and to anyone passing the ticket receptacle that only green tickets should be deposited. Passengers getting on in zone 2 when the car is north bound cannot ride to zone 1 because the car has already passed zone 1. The contact 330 now connects the terminals 325 and 326 and the contact 339 engages the terminals 334 and 335 so that the cores 310 and 311 are withdrawn from locking engagement with the levers 105 and 106 respectively while the circuit communicating with the core 306 is opened for there is no contact on the drum 213 to connect the terminals 317 and 318 so that the core 309 engages the lever 104 and locks it against operation thereby preventing the conductor from operating the said lever.

If the passenger gets on in zone 2 going north and destined for zone 2 he should be charged 3¢ and all that the conductor has to do is to pull down the lever 105 which brings the contact 132 into engagement with the finger 134 and 135 from whence the current passes through the lead 262 to the terminals 223 and 228 which are adjacent the disk 214. The contact 226 is now connecting the terminals 228 and 227 so that the current continues through the lead 266 to the lead 268 connected to the lead 83 which operates the 3¢ tablet and registers this fare on the counter 22. If the passenger gets on in zone 2 when the car is going north and desires to go to zone 3 he should pay 4¢. The conductor pulls down on the lever 106 bringing the contact finger 141 into engagement with the spring contacts 138 and 139 so that the current now passes through the lead 263 to the terminals 225, 231 and 234 which are adjacent the disk 215 on which the contact 229 engages the terminal 231 with the terminal 230 from whence the lead 271 extends and communicates with the lead 272 connected to the lead 91 so that the solenoid 76 is operated, projecting a 4¢ tablet into view and registering on the counter 23.

When the car passes north bound into zone 3 the conductor manually rotates the hand crank 10 into its "3N" position shown in Figure 12 which rotates the ticket receptacle so as to bring the blue sector 292 beneath the opening 298 showing that now only blue tickets are acceptable. The light behind the window 3 is now illuminated and the printing type on the drums 206, 207, and 208 are rotated so as to bring into printing position the characters "North 3". A passenger getting on in this zone can have no other destination than the same zone. He, therefore, should be charged 3¢. The amount that the conductor should collect is directly before him on the drum 347. The cores 309 and 310 of the solenoids 306 and 307 respectively lock the lever 104 and 105 against operation and there is no contact on either of the disks 213 or 214 bridging the contacts 317 and 318 or 325 and 326 respectively. There is a current, however, passing through the circuit in which the solenoid 308 is placed for the contact 340 is engaging the terminals 334 and 335. Therefore, the levers 104 and 105 are locked against operation. The conductor pulls on the hand lever 106 moving the contact finger 141 into engagement with the spring contacts 138 and 139 so that the current passes through the lead 263 to the terminals 235, 231, and 234. The terminal 234 is connected to the terminal 233 by means of the contact 232 mounted on disk 215 (Figure 19), from whence the current passes through the lead 267 to the lead 268 which is connected to the lead 83 which communicates with the 3¢ solenoid 75 which when actuated causes its core to be projected so that if the motor is then operated the 4¢ tablet will be projected into view and the fare will be registered on the counter 22.

When the car has reached the end of its north bound run it will now pass through zone 3, 2 and 1 going south. We are now in zone 3 and the conductor moves the hand crank 10 to the "3S" position shown in Figure 12 which rotates the drums 206, 207 and 208 so as to bring the type "South 3" into printing position. At the same time the ticket receptacle is similarly rotated so that only tickets issued in zone 3 going south should be deposited. The light behind the window 3 is illuminated and the three drums 213, 214, and 215 are rotated so that the contact 237 connects the terminals 238 and 239 while the contact 236 on the drum 214 connects the terminals 222 and 223 while the contact 235 on the drum 215 connects the terminals 233 and 234. If now the hand lever 106 is pulled downwardly a ticket will be issued having thereon the date and "South 3" which ticket will be green and a 3¢ fare will be shown and registered while if he pulls down on lever 105 a 4¢ fare will be indicated and registered while if he pulls down on the lever 104 a 5¢ fare will be shown and registered. In like manner when we pass into zone 2 going south, if the passenger desires to go to zone 2 the lever 105 would be operated to register 3¢ fare, whereas if he desires to go to zone 1 the conductor would pull down on the lever 104 which would register a 4¢ fare. In like manner when the car has passed into zone 3 going south the hand lever 104 would be the only lever to be used which would register a 3¢ fare.

Regardless, therefore, of the direction of travel or the zone in which the car is moving the only thing that the conductor has to do to issue a ticket to a passenger for the zone in which he then is or for any other zone to which they will go is to pull down on one lever and the ticket will be issued to the passenger which shows the destination of the passenger, the date on which it was issued, the direction of travel and the zone in which he got on. As above described, the light behind the windows 1, 2, and 3 show the zone in which the car is at that time. The registration of the fare and the indication that the fare has been paid is all automatically operated and the motor is automatically cut off after it has made one revolution. Furthermore, the ticket receptacle is so positioned that if a passenger places therein a ticket having any other color than the ticket of the zone in which he gets off this will be instantly called to the attention of the auditor. If, for instance, a red ticket is deposited in zone 3 north bound the auditor at once knows that that passenger paid only a 3¢ fare and that he got on in zone 1 and got off in zone 3. The auditor further knows that the proper fare should have been 5¢. That ticket was deposited under the inspection of the conductor and the conductor is held responsible for the difference between the fare that was previously paid, namely 3¢, and that which should have been paid, namely 5¢, so that the conductor must make good the difference, or 2¢. This difference, however, should never come out of the pocket of the conductor because the conductor has before him the ticket, as well as the color of the sector appearing through the opening 298 so that the attention of the conductor is at once called to the fact that the passenger is presenting a ticket not good for the destination to which he has traveled and the conductor must, therefore, collect the difference between the fare paid and the fare that should have been paid. Of course, if a passenger got on in zone 1 and bought a ticket to zone 3 going north and later decided to get off in zone 1 he would have a blue ticket which he would deposit in the red compartment adjacent the sector 290. Of course, under this condition we have a wrong colored ticket in the red compartment but that ticket on its very face shows that the passenger did not over ride but that he paid more for his ride than what he was called upon to pay and the operating company, therefore, has collected all to which it was entitled.

It is obvious that any changes may be made in the specific form shown by way of illustration in this application and I, therefore, desire to claim my invention broadly except as I may limit myself in the following claims. Having now described my invention, I claim:

1. In a register, a plurality of operating means to issue tickets of various characteristics corresponding to destination zones, a plurality of registering means corresponding in number to the number of operating means, adjustable means settable to positions corresponding to the zone in which the conveyance is at that time, and means carried thereby to select which one of said registering means will be actuated by the operation of any one of said operating means.

2. In a register, an adjustable means capable of being adjusted to various positions corresponding to the zone in which the conveyance is at that time, means operated by said adjustable means to indicate that zone, printing means adjusted into printing position by said adjustable means, and a ticket receptacle moved by said adjustable means so as to bring a part of said receptacle corresponding to the said zone into position where a ticket may be deposited therein and means to close all other parts of said receptacle.

3. In a register, a plurality of operating means corresponding to the zones of destination of passengers, an adjustable means, means to adjust said adjustable means to a position corresponding to the zone of embarcation, and means controlled by said adjustable means to lock any operating means which corresponds to a zone through which the conveyance has already passed.

4. In a register, a plurality of operating means to issue tickets of various characteristics corresponding to destination zones, a plurality of registering means corresponding in number to the number of operating means, adjustable means rotatable to positions corresponding to the zone in which the conveyance is at that time, and means carried thereby to select which one of said registering means will be actuated by the operation of any one of said operating means.

JOHN F. OHMER.